United States Patent
Kanaan

[11] Patent Number: 5,636,851
[45] Date of Patent: *Jun. 10, 1997

[54] TAPPING COLLET

[75] Inventor: Roger J. Kanaan, Easley, S.C.

[73] Assignee: Power Tool Holders, Inc., Wilmington, Del.

[*] Notice: The portion of the term of this patent subsequent to May 27, 2013, has been disclaimed.

[21] Appl. No.: 456,118

[22] Filed: May 31, 1995

[51] Int. Cl.$^6$ .................................... B23B 31/20
[52] U.S. Cl. .................. 279/46.7; 279/156; 408/222; 470/103
[58] Field of Search .................. 279/46.7, 49, 54; 408/156, 222, 240; 470/103

[56] References Cited

U.S. PATENT DOCUMENTS

| Re. 19,312 | 9/1934 | Glenzer | 279/103 |
|---|---|---|---|
| 1,252,335 | 1/1918 | Foote | 279/54 |
| 2,346,706 | 4/1944 | Stoner . | |
| 2,829,899 | 4/1958 | Drew et al. . | |
| 3,246,903 | 4/1966 | Sattler . | |
| 3,583,714 | 6/1971 | Weltzer et al. . | |
| 4,795,292 | 1/1989 | Dye . | |
| 4,989,887 | 2/1991 | Jordan . | |
| 5,324,050 | 6/1994 | Kanaan | 279/46.9 |
| 5,383,673 | 1/1995 | Mogilnicki | 279/46.4 |
| 5,405,155 | 4/1995 | Kanaan et al. . | |

OTHER PUBLICATIONS

British Standards Institution —Specification for Machine Tool Components Part 7: 1973.
Entwurf, Aug., 1989 —Deutsche Norm.
Deutsche Normen —Apr., 1961 —Push Out Collets.
Deutsche Norm —Nov., 1957–Drawback Collets and Taper Sleeves for Collets.
Deutsche Normen —May, 1977.
Advertisement —Kennametal —Erickson Rotating NC Tooling.
Advertisement —Jacobs Tap Chucks.
Deutsche Norm —Jul., 1986.
Japanese Industrial Standard —Spring Collets.

*Primary Examiner*—Steven C. Bishop
*Attorney, Agent, or Firm*—Dority & Manning

[57] ABSTRACT

A tapping collet is actuated by engagement with a mating surface of a collet holder for holding a tap having a round shank portion and a square shank portion. The collet has a plurality of independent gripping jaws circumferentially disposed at essentially 90 degree intervals about a centerline axis through the collet. The gripping jaws have an inner face parallel to the centerline axis and an outer face which defines an outer surface for engaging a collet holder mating surface. Resilient material is disposed between the gripping jaws for holding the jaws in the desired spaced relation. The gripping jaws comprise a step portion which extends radially inward and defines a second inner diameter opening to engage the flat sides of the square shank portion of a tap inserted into the collet. The continuous outer diameter seal is disposed circumferentially about the outer surface of the collet and a continuous inner diameter seal is disposed circumferentially within a first inner diameter opening of the collet.

10 Claims, 3 Drawing Sheets

TAPPING COLLET

BACKGROUND OF THE INVENTION

The present invention relates to machine collets, and more particularly to a collet for use with taps.

As understood in the art, conventional taps require a relatively high degree of rotational torque for operation. Thus, the tool holding device, such as a tap collet, must be able to transmit the high rotational torque to the tapping tool. The tap itself has a round shank portion and a multi-sided rear shank portion. Typically, the multi-sided portion comprises a square profile. Split steel tap collets are known in the art for positively driving a tap having a tap square as described above. Kennametal, Inc. of Latrobe, Pa., manufactures and sells such a split steel tap collet. The conventional split steel tap collets, however, have a significant drawback in that they are relatively ineffective as sealing collets in situations wherein it is desired to conduct a coolant fluid to the tap through the collet. Due to the open spaces between the split steel gripping surfaces and the open sides of the square portion of the tap corresponding to the tap square, an effective seal cannot be obtained with this type of split steel tap collet. In many applications, it is highly desirable to conduct a relatively high pressure coolant fluid to the working surfaces of the tap through the collet and associated tool holder. Conventional split steel collets have proven relatively ineffective in this situation.

The Jacobs® Chuck Manufacturing Company manufactures and markets a well known Rubber-Flex® collet of the type having a plurality of individual independent gripping members held in position and equally spaced about a common axis. The spaces between the gripping members is filled with an adherent resilient material, such as rubber or a rubber composition. The benefits of the Rubber-Flex® collet over conventional split steel collets in both gripping strength and in sealing applications are well known to those skilled in the art. However, it was previously not thought of to utilize a Rubber-Flex® collet as a tap collet due to the relatively high rotational torque required for tap collets. Thus, the benefits of a Rubber-Flex® collet have generally not been recognized or appreciated in the tap collet line.

OBJECTS AND SUMMARY OF THE INVENTION

It is therefore a principal object of the present invention to provide an improved sealing tap collet.

It is a further object of the present invention to incorporate the benefits of a Rubber-Flex® collet with a tap collet.

And yet another object of the present invention is to provide a sealing collet which allows for the induction of relatively high pressure coolant fluid to the working surfaces of a tap.

A still further object of the present invention is to provide a Rubber-Flex® collet having the capability to transmit the high rotational torque required in tapping operations.

Additional objects and advantages of the invention will be set forth in part in the following description, or may be learned through practice of the invention. The objects and advantages of the invention may be realized and attained by means of the instrumentalities and combinations particularly pointed out in the appended claims.

In accordance with the objects of the present invention, a machine tool tapping collet is provided which is actuated by engagement with a mating surface of a collet holder. Actuation of a collet with a collet holder is well understood by those skilled in the art. The collet includes a plurality of independent gripping jaws held in a desired longitudinally and equally spaced angular position about a longitudinal centerline axis through the collet. The gripping jaws have an inner face parallel to the centerline axis and an outer face whereby the plurality of gripping jaws define an outer surface for engaging the collet holder mating surface. Resilient material is disposed between the gripping jaws for holding the jaws in the desired spaced relation. The gripping jaw inner faces further define a first inner diameter opening for receipt of the round shank portion of a conventional tap. The gripping jaws further define a second inner diameter opening in axial alignment with the first inner diameter opening for receipt of the square tap shank portion. In this manner, the gripping jaws are circumferentially disposed at essentially 90 degree intervals about the centerline axis. The gripping jaw inner faces further comprise a step portion which extends radially inward and defines the second inner diameter opening. The gripping jaw inner faces at the second inner diameter opening engage the flat sides of the square shank portion inserted into the collet. The collet further includes an outer diameter seal disposed circumferentially about the outer surface and which extends circumferentially radially outward beyond the outer faces of the gripping jaws. The collet further includes a continuous inner diameter seal disposed circumferentially within the first inner diameter opening and extending circumferentially radially inward beyond the inner faces of the gripping jaws.

In a preferred embodiment of the invention, the collet comprises at least four gripping jaws, with one gripping jaw disposed at each 90 degree interval. In an alternative preferred embodiment, pairs of gripping jaws are disposed at the 90 degree intervals.

Preferably, the continuous inner diameter seal is formed integral with the resilient material and the continuous outer diameter seal is also formed integral with the resilient material. Preferably, the inner and outer diameter seals comprise double lip seals and are molded integral with the resilient material.

It is also preferred that each gripping jaw further comprise at least one perforation defined therethrough. The resilient material extends through these perforations and forms essentially concentric rings of resilient material through the gripping jaws.

The collet also preferably includes longitudinal channels which are defined in the resilient material between the gripping jaws. These longitudinal channels define coolant induction ports wherein coolant is conveyed within the collet up to the inner diameter seal.

The step portion of the gripping jaw inner faces at the second inner diameter opening preferably comprises a longitudinal section of gripping jaw inner face which is longitudinally parallel to the gripping jaw inner face at the first inner diameter opening. The step portion in this embodiment is defined by a ridge of the gripping jaw which extends radially inward and perpendicular to the inner faces.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
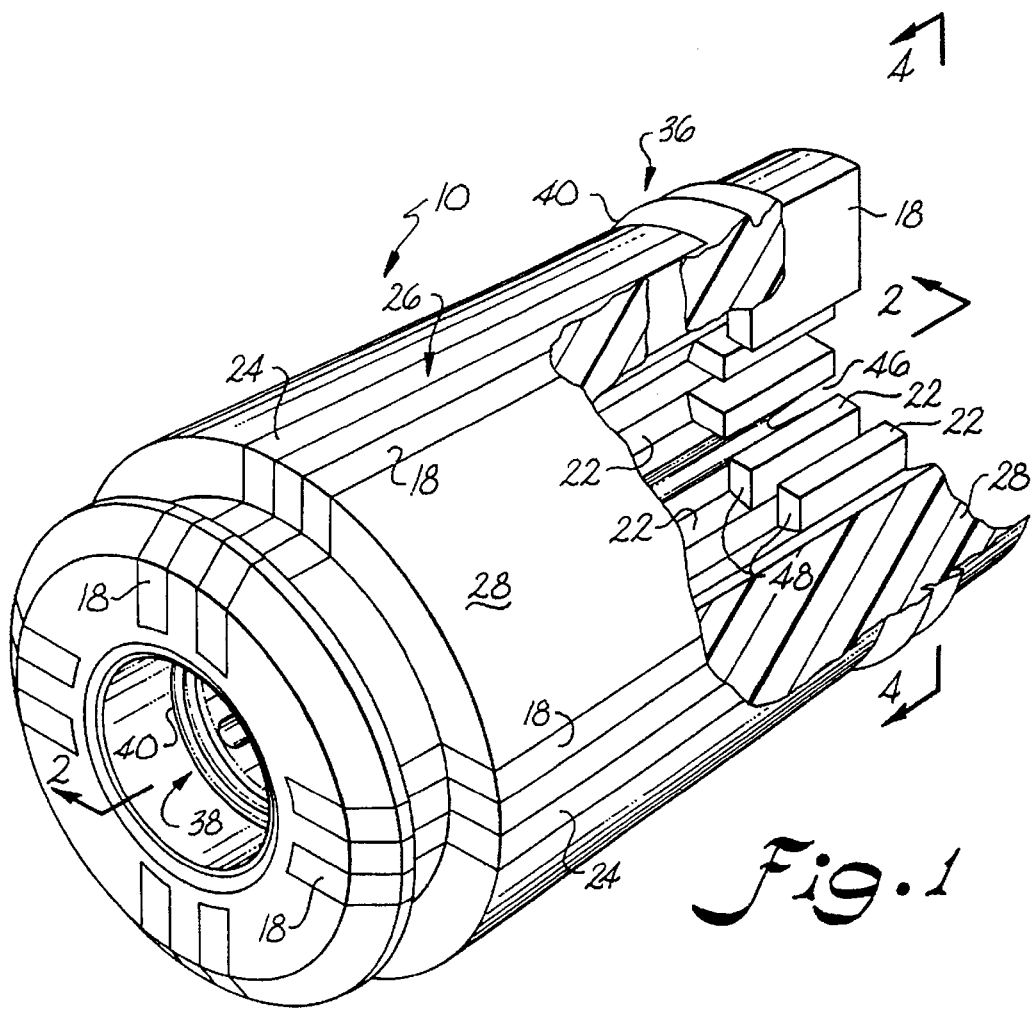
FIG. 1 is a partial cut-away perspective view of the tapping collet according to the invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

Figure 2:
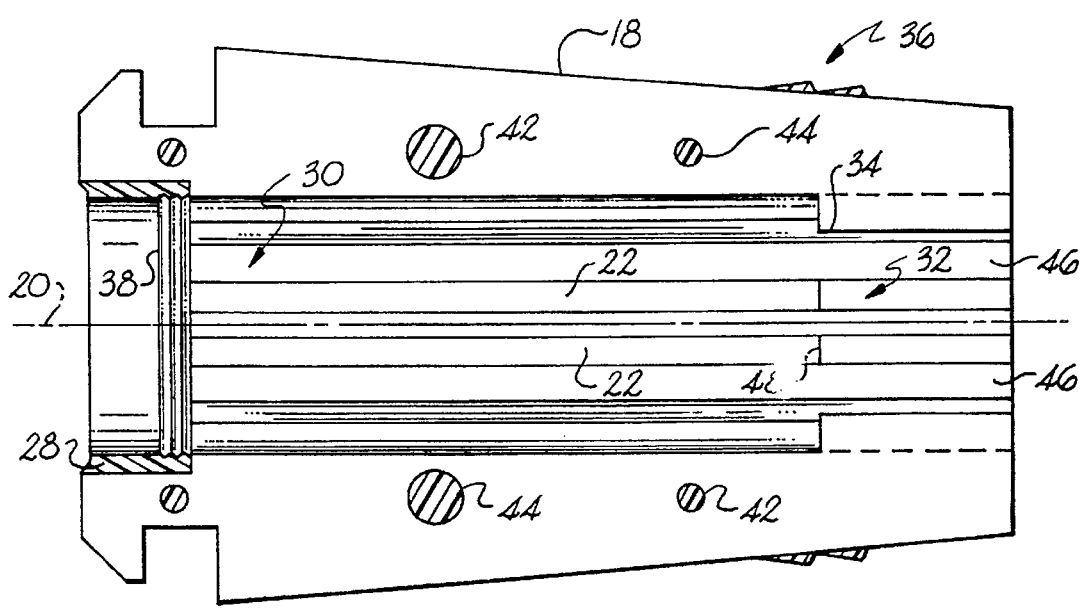
FIG. 2 is a cut-away side view of the collet shown in FIG. 1 taken along the lines indicated.

Referring to FIG. 1 in particular, a tap collet 10 is provided. Collet 10 includes a plurality of gripping jaws 18 held in a desired spaced relation relative to each other and the longitudinal centerline 20 (FIG. 2) through the collet. Gripping jaws 18 are held in place by resilient material 28 between each gripping jaw. Material 28 also preferably extends through perforations 42 within gripping jaws 18 so as to form essentially concentric rings of resilient material 44 through gripping jaws 18.

Figure 3:
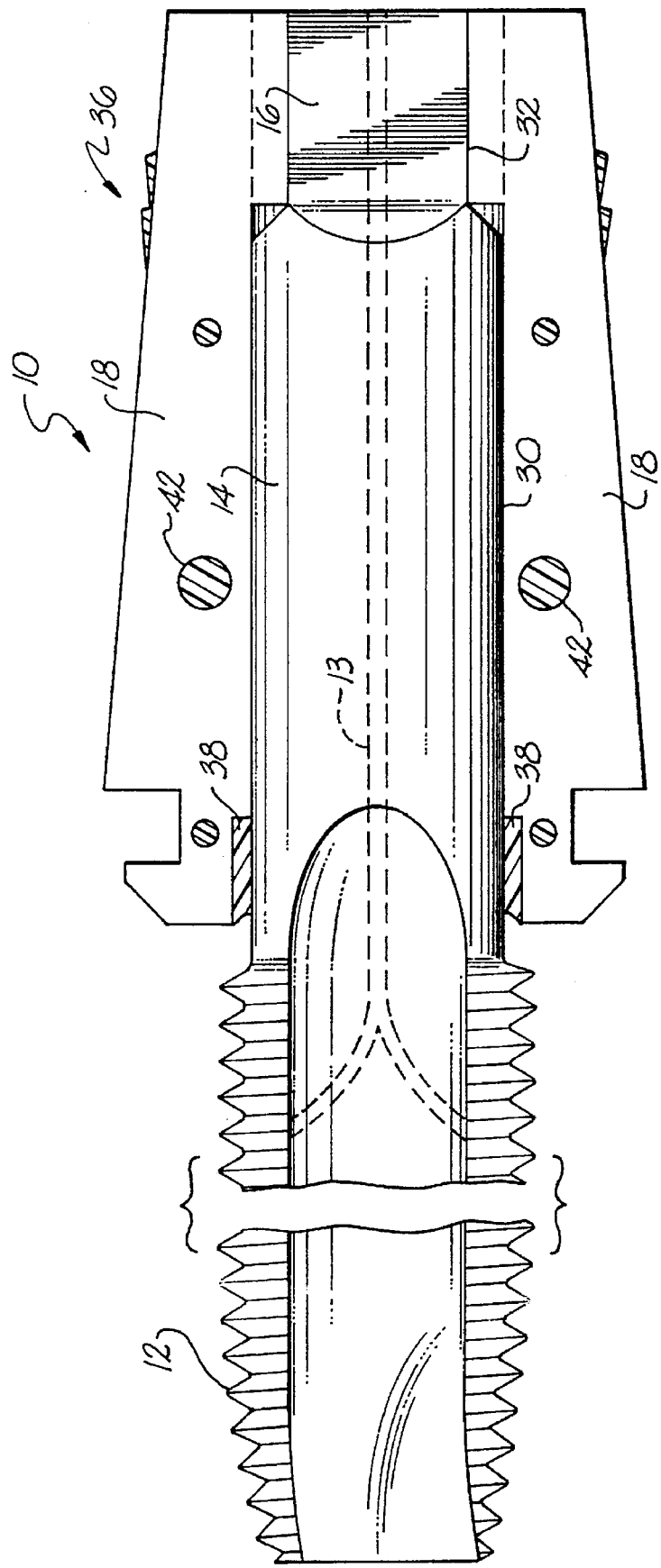
FIG. 3 is a cut-away side perspective view of the present collet illustrating a tap inserted within the collet.

Collet 10 is designed to hold a conventional tap having a round shank portion 14 and a square shank portion 16, as illustrated in FIG. 3. Such taps are well known in the art, and a detailed explanation of the tap is not necessary for purposes of the present disclosure. The gripping jaws 18 are disposed around longitudinal centerline axis 20 such that the inner faces 22 of jaws 18 define a first inner diameter opening 30 for receipt of round shank portion 14 of tap 12. Likewise, jaw inner faces 22 also define a second inner diameter opening 32 in axial alignment with first inner diameter opening 30 for receipt of the square shank portion 16 of tap 12. In this regard, jaws 18 are circumferentially disposed at essentially 90 degree intervals about centerline axis 20, as generally illustrated in the figures. Accordingly, collet 10 includes at least four gripping jaws 18, and preferably includes at least pairs of gripping jaws 18 disposed at 90 degree intervals as particularly illustrated in the figures. Thus, the jaw inner faces 22 contact and grip round shank portion 14 of tap 12 within the first inner diameter opening 30. In the embodiment wherein pairs of jaws are utilized at the 90 degree intervals, jaws 18 are disposed parallel to each other such that the inner faces 22 define an essentially flat or horizontal line of contact against the tap shank, as will be more fully explained below.

Gripping jaws 18 comprise a step portion 34 which extends radially inward from first inner diameter opening 30. Step portion 34 essentially defines the second inner diameter opening 32. Thus, step portion 34 extends radial inward such that the inner faces of jaw blades 18 within second diameter opening 32 will contact and engage the flat sides of the multi-sided or square shank portion of tap 12.

Step portion 34 is preferably defined by a ridge 48 formed in jaw blades 18. Ridge 48 extends perpendicular to inner jaw faces 22. As clearly seen in FIGS. 1 and 2, jaw blades 18 comprise a longitudinally extending section rearward of ridge 48. These longitudinally extending sections essentially define second inner diameter opening 32. Thus, inner diameter opening 32 comprises at least one jaw blade, and preferably two parallel jaw blades, to contact each side of the square shank portion 16 of tap 12. It should thus be understood that the inner faces 22 of jaw blades 18 within first inner diameter opening 30 are disposed at a radial distance from the longitudinal centerline 20 so as to contact and grip on the outer circumference of round shank portion 14. The flat sides of square shank portion 16 of tap 12 are radially inward of the circumference of the round shank portion 14 and, thus, the inner faces 22 of jaw blades 18 defining second inner diameter opening 32 extend radially inward from the inner faces defining first inner diameter opening 30. Preferably, the inner diameter faces 22 in the first and second inner diameter openings are parallel.

In order to insert tap 12 within collet 10, it is necessary for the operator to turn the tap until the square shank portion 16 is aligned with second inner diameter opening 32.

Jaws 18 further include an angled exposed outer face 24 whereby the plurality of outer faces 24 define an essentially conical outer surface 26 which matches a complimentary conical receiving surface of a collet holder (not shown).

As depicted generally in the figures, in a preferred embodiment of the invention, resilient material 28 is generally flush with the outer exposed faces 24 of gripping jaws 18. However, this is not necessarily a limitation of the invention. In another embodiment of the invention, resilient material 28 may be defined generally below the exposed outer faces 24 of jaws 18. Compression recesses (not shown) may also be defined in the resilient material between jaw blades 18 to allow for greater compression of collet 10 within its respective mating collet holder. The necessity of compression recesses is dependent upon the resiliency and/or volume of resilient material between the respective gripping jaws 18.

Referring particularly to FIG. 3, it is highly desirable in many applications of taps to conduct a coolant fluid to the cutting surfaces of tap 12 through coolant port 13 defined through tap 12, as understood in the art. In this regard, collet 10 further includes a continuous outer diameter seal 36, as particularly shown in FIGS. 1 and 3. Outer seal 36 is formed preferably integral with resilient material 28 and is also formed of the same material as resilient material 28. In this manner, outer seal 36 is molded integral with resilient material 28. In a preferred embodiment of the invention, outer seal 36 comprises a double lip seal 40, as indicated in FIG. 1. In an alternative embodiment, seal 36 may comprise a single lip.

Collet 10 also includes a continuous inner diameter seal 38, as illustrated in the figures. Seal 38 is also preferably formed integral with resilient material 28 and, in a preferred embodiment, also comprises a double lip seal 40 as illustrated particularly in FIG. 1. Again, this double lip seal is also preferably molded integral with resilient material 28.

The design and operation of the continuous inner and outer diameter seals of the present tapping collet are discussed extensively in my U.S. Pat. No. 5,324,050, which is herein incorporated by reference.

Figure 4:
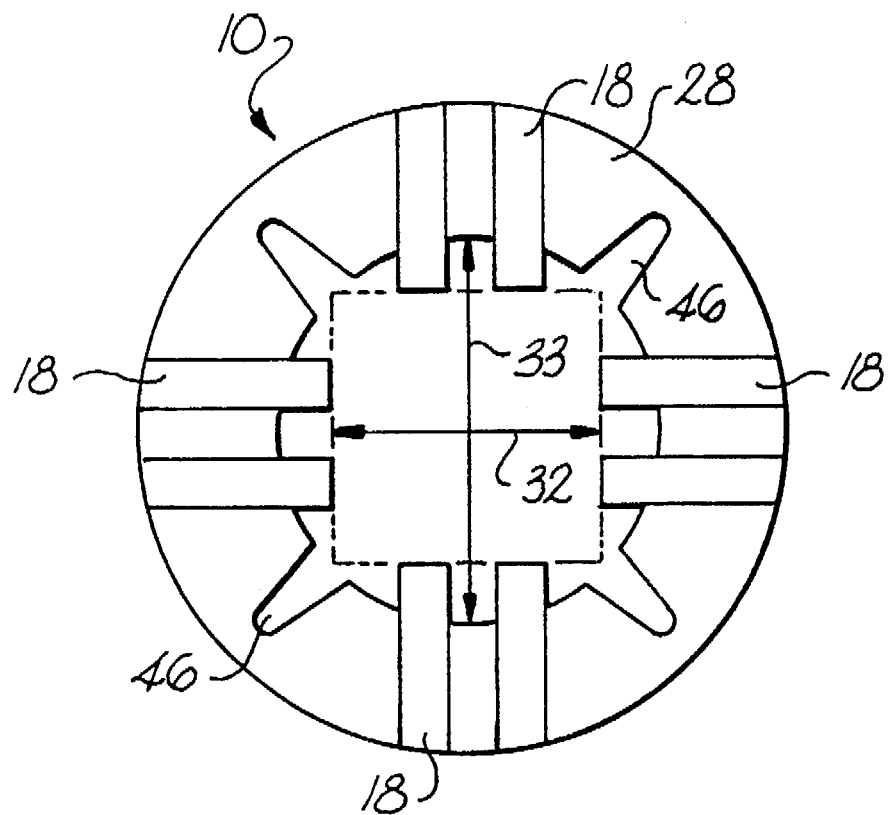
FIG. 4 is an end view of the present tap collet particularly illustrating the longitudinal channels and first and second inner diameter openings of the collet.

Referring particularly to FIG. 4, the present collet 10 also preferably includes longitudinal channels 46 defined in resilient material 28 from the back end or surface of collet 10 essentially to the inner diameter seal 38. Channels 46 serve the dual purpose of allowing for greater compression of collet 10 and also for conducting coolant fluid within collet 10. For example, in a conventional tap wherein a coolant channel is defined through the tap, relatively high pressure coolant fluid can be introduced to collet 10 within a collet holder. The coolant fluid is prevented from leaking around the collet 10 by means of the continuous outer diameter seal 36 and is prevented from leaking through the collet by means of continuous inner diameter seal 38. The coolant will be contained within collet 10 and directed to the channel or hole defined through the tap tool. Alternatively, the coolant may be directed from within collet 10 to a work piece by means of a coolant port defined through the front face of the collet and in communication with the longitudinal channels 46. This embodiment is described in my U.S. Pat. No. 5,405,155 which is also incorporated herein by reference.

The present inventive tapping collet 10 offers several distinct advantages over conventional tapping collets. For example, collet 10 has a far greater degree of compressibility as compared to a split-steel collet. Thus, a single collet 10 may be used for two different sized taps whereas two split-steel collets would be needed. The sealing capabilities of collet 10 also cannot be achieved by conventional tapping collets.

It will be apparent to those skilled in the art that various modifications and variations can be made in the present apparatus without departing from the scope or spirit of the invention. Thus, it is intended that the present invention cover the modifications and variations of this invention provided they come within the scope of the appended claims and their equivalents.

What is claimed is:

1. A machine tool tapping collet which is actuated by engagement with a mating surface of a collet holder for holding a tap having a round shank portion and a multi-sided shank portion, said tapping collet comprising:

a plurality of independent gripping jaws held in a desired longitudinally and equally spaced angular position about a longitudinal centerline axis through said collet, said gripping jaws having an inner face parallel to the centerline axis and an outer face whereby said plurality of gripping jaws define an outer surface for engaging the collet holder mating surface;

resilient material disposed between said gripping jaws for holding said plurality of gripping jaws in said desired spaced relation;

said gripping jaw inner faces defining a first inner diameter opening for receipt of the round shank portion of the tap and a second inner diameter opening in axial alignment with said first inner diameter opening for receipt of a multi-sided shank portion of the tap, said gripping jaws circumferentially disposed at essentially 90 degree intervals about said centerline axis, said gripping jaw inner faces comprising a step portion extending radially inward and defining said second inner diameter opening so as to engage the flat sides of the multi-sided shank portion inserted into said collet;

a continuous outer diameter seal disposed circumferentially about said outer surface and extending circumferentially radially outward beyond said outer faces of said gripping jaws, and a continuous inner diameter seal disposed circumferentially within said first inner diameter opening and extending circumferentially radially inward beyond said inner faces of said gripping jaws.

2. The tapping collet as in claim 1, comprising at least four said gripping jaws, one said gripping jaw disposed at each said 90 degree interval.

3. The tapping collet as in claim 1, comprising at least two said gripping jaws at each said 90 degree interval, said gripping jaws at each said 90 degree interval being parallel.

4. The tapping collet as in claim 1, wherein said continuous inner diameter seal is formed integral with said resilient material.

5. The tapping collet as in claim 1, wherein said continuous outer diameter seal is formed integral with said resilient material.

6. The tapping collet as in claim 1, wherein said continuous inner and outer diameter seals comprise double lip seals.

7. The tapping collet as in claim 1, wherein said continuous inner and outer diameter seals are molded integral with said resilient material.

8. The tapping collet as in claim 1, wherein each said gripping jaw further comprises at least one perforation defined therethrough, said resilient material extending through said perforations so as to form essentially a concentric ring of resilient material through said gripping jaws.

9. The tapping collet as in claim 1, further comprising longitudinal channels defined in said resilient material between said gripping jaws.

10. The tapping collet as in claim 1, wherein said step portion of said gripping jaw inner faces at said second inner diameter opening comprises a longitudinal section of gripping jaw inner face which is longitudinally parallel to said gripping jaw inner face at said first inner diameter opening, said step portion defined by a ridge extending radially inward and perpendicular to said inner faces.

\* \* \* \* \*